US011829733B2

(12) United States Patent
Datta et al.

(10) Patent No.: US 11,829,733 B2
(45) Date of Patent: Nov. 28, 2023

(54) SYNTHESIS FLOW FOR DATA PROCESSING ENGINE ARRAY APPLICATIONS RELYING ON HARDWARE LIBRARY PACKAGES

(71) Applicant: Xilinx, Inc., San Jose, CA (US)

(72) Inventors: Sumanta Datta, Hyderabad (IN); Srijan Tiwary, Chhattisgarh (IN); Aman Gayasen, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/456,002

(22) Filed: Nov. 22, 2021

(65) Prior Publication Data

US 2023/0161569 A1 May 25, 2023

(51) Int. Cl.
*G06F 8/36* (2018.01)
*G06F 8/75* (2018.01)
*G06F 8/20* (2018.01)
*G06F 8/41* (2018.01)

(52) U.S. Cl.
CPC .................. *G06F 8/36* (2013.01); *G06F 8/20* (2013.01); *G06F 8/44* (2013.01); *G06F 8/75* (2013.01)

(58) Field of Classification Search
CPC ..... G06F 8/36; G06F 8/20; G06F 8/44; G06F 8/75
See application file for complete search history.

(56) References Cited

U.S. PATENT DOCUMENTS 9,223,921 B1 * 12/2015 Carrillo .................. G06F 30/34
10,628,622 B1 4/2020 Sivaraman et al.
10,747,690 B2 8/2020 Bilski et al.
10,802,807 B1 10/2020 Hsu
10,860,766 B1 12/2020 Sivaraman et al.
11,550,632 B2 * 1/2023 Li ......................... G06F 9/5027
2013/0215117 A1 * 8/2013 Glaister .................. G06F 8/456 345/426
2013/0346979 A1 * 12/2013 Nightingale .......... G06F 30/327 718/100
2017/0262567 A1 * 9/2017 Vassiliev .......... H03K 19/17704
2019/0278574 A1 * 9/2019 Ravishankar ....... G06F 16/9024
2019/0303033 A1 * 10/2019 Noguera Serra ... G06F 15/7807
2020/0110590 A1 * 4/2020 Lisuk .................. G06F 9/44505
2020/0371759 A1 11/2020 Sastry et al.
2020/0371761 A1 11/2020 Gupta et al.
2021/0110506 A1 * 4/2021 Prakash ................ G06F 9/4887

* cited by examiner

*Primary Examiner* — Wei Y Zhen
*Assistant Examiner* — Amir Soltanzadeh
(74) *Attorney, Agent, or Firm* — Kevin T. Cuenot

(57) ABSTRACT

Implementing an application for a data processing engine (DPE) array can include detecting, using computer hardware, a component of a hardware library package instantiated by an application. The application is specified in source code and is configured to execute on a DPE array. An instance of the component is extracted from the application. The extracted instance specifies values of parameters for the instance of the component. The instance can be partitioned by generating program code defining one or more kernels corresponding to the instance of the component. The partitioning is based on a defined performance metric of the component and a defined performance requirement of the application. The application is transformed by replacing the instance of the component with the program code generated by the partitioning. The application, as transformed, is compiled into program code executable by the DPE array.

19 Claims, 13 Drawing Sheets

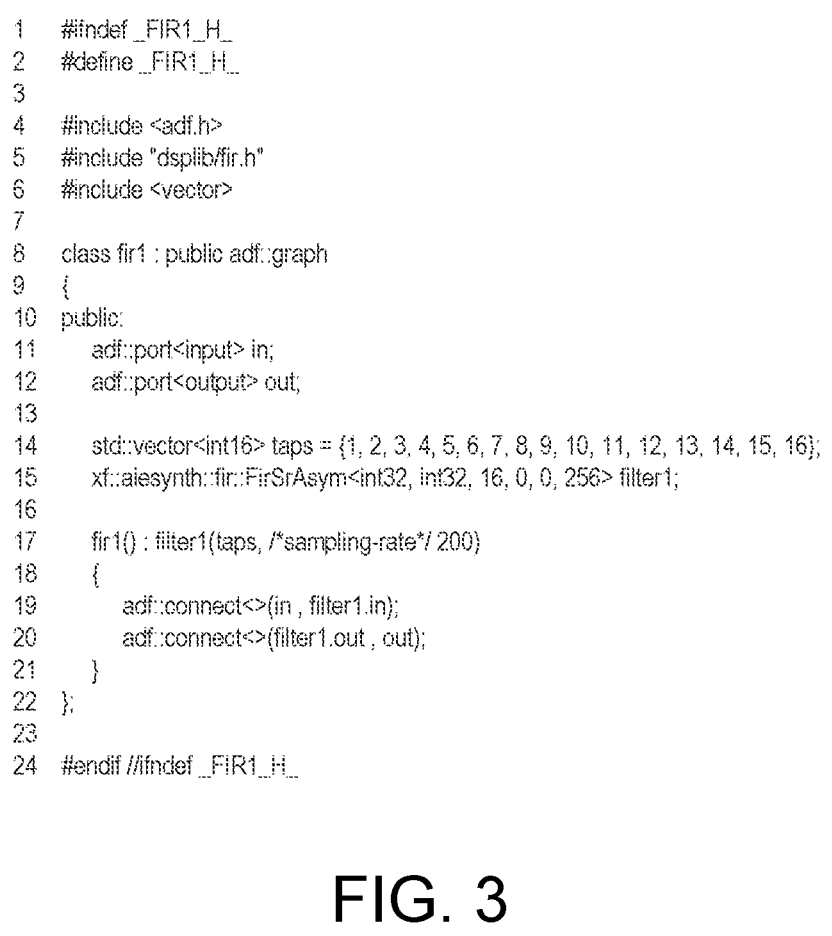

```
#ifndef _FIR1_H_
#define _FIR1_H_

#include <adf.h>
#include "dsplib/fir.h"
#include <vector>

class fir1 : public adf::graph
{
public:
    adf::port<input> in;
    adf::port<output> out;

    std::vector<int16> taps = {1, 2, 3, 4, 5, 6, 7, 8, 9, 10, 11, 12, 13, 14, 15, 16};
    xf::aiesynth::fir::FirSrAsym<int32, int32, 16, 0, 0, 256> filter1;

    fir1() : filter1(taps, /*sampling-rate*/ 200)
    {
        adf::connect<>(in , filter1.in);
        adf::connect<>(filter1.out , out);
    }
};

#endif //ifndef _FIR1_H_
```

FIG. 3

```
template<typename DataType,
            typename CoefType,
            int FirLength,
            int Shift,
            int RoundMode,
            int InputWindowSize,
            int CoeffReload=0
            >
class FirSrAsym : public adflibsynth::libsynth
{
public:
    adf::port<input> in;
    adf::port<output> out;

    FirSrAsym(std::vector<CoefType> &Coeffs, int SamplingRate);
    FirSrAsym(std::vector<CoefType> &Coeffs, int SamplingRate, int CascadeLength);
};
```

FIG. 4

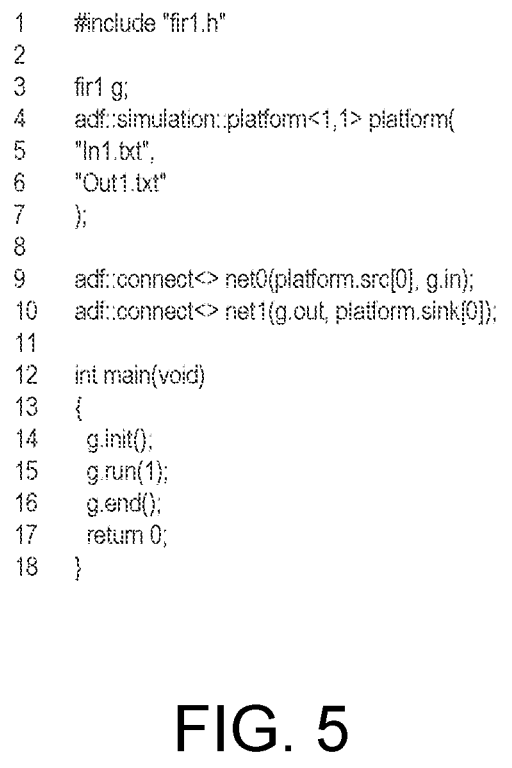

```
#include "fir1.h"

fir1 g;
adf::simulation::platform<1,1> platform(
"In1.txt",
"Out1.txt"
);

adf::connect<> net0(platform.src[0], g.in);
adf::connect<> net1(g.out, platform.sink[0]);

int main(void)
{
  g.init();
  g.run(1);
  g.end();
  return 0;
}
```

FIG. 5

```
{
    "lib_instances": [
        {
            "instance_name": "fir1::filter1",
            "lib_info": {
                "class_name": "xf::aiesynth::fir::FirSrAsym",
                "tmpl_params": [
                    {
                        "name": "DataType", "value": "int32"
                    },
                    {
                        "name": "CoefType", "value": "int32"
                    },
                    {
                        "name": "FirLength", "value": "16"
                    },
                    {
                        "name": "Shift", "value": "0"
                    },
                    {
                        "name": "RoundMode", "value": "0"
                    },
                    {
                        "name": "InputWindowSize", "value": "256"
                    },
                    {
                        "name": "CoeffReload", "value": "0"
                    }
                    ],
                        "ctor_params": [
                    {
                        "name": "Coeffs", "value": { 1, 2, 3, 4, 5, 6, 7, 8, 9, 10, 11, 12, 13, 14, 15, 16 }
                    },
                    {
                        "name": "SamplingRate", "value": "200"
                    }
                ],
            }
        }
    ]
}
```

FIG. 6

```
#ifndef _AIESYNTH_FIR1_FILTER1_GRAPH_GRAPH_H_
#define _AIESYNTH_FIR1_FILTER1_GRAPH_GRAPH_H_

#include <adf.h>
#include "fir_sr_asym_graph.hpp"

class aiesynth_fir1_filter1_graph : public adf::graph
{
public:
    adf::port<input> in;
    adf::port<output> out;

    xf::dsp::aie::fir::sr_asym::fir_sr_asym_graph<int32, int32, 16, 0, 0, 256, 1> filter;

    aiesynth_fir1_filter1_graph(std::vector<int32> &taps) : filter(taps)
    {

        adf::kernel *filter_kernels = filter.getKernels();

        for (int i=0; i<1; i++) {
            adf::runtime<ratio>(filter_kernels[i]) = 0.752344;
        }

        adf::connect<> net0(in , filter.in);
        adf::connect<> net1(filter.out , out);
    }
};

#endif //ifndef _AIESYNTH_FIR1_FILTER1_GRAPH_GRAPH_H_
```

FIG. 7

```
#ifndef _FIR1_GRAPH_H_
#define _FIR1_GRAPH_H_

#include <adf.h>
#include "dsplib/fir.h"
#include <vector>

/* aiesynthesizer-transformed */
#include "aiesynth_fir1_filter1_graph/aiesynth_fir1_filter1_graph.h"

class fir1 : public adf::graph
{
public:
    adf::port<input> in;
    adf::port<output> out;

    std::vector<int32> taps = {1, 2, 3, 4, 5, 6, 7, 8, 9, 10, 11, 12, 13, 14, 15, 16};

    /* aiesynthesizer-transformed */aiesynth_fir1_filter1_graph filter1;
    fir1() : /* aiesynthesizer-transformed */filter1(taps)
    {
        adf::connect<>(in , filter1.in);
        adf::connect<>(filter1.out , out);
    }
};
```

Detect a component of a hardware package library instantiated by an application configured to execute on a data processing engine (DPE) array, wherein the application is specified using high-level programming language source code

1302

↓

Extract an instance of the component from the application, wherein the extracted instance specifies values of parameters for the instance of the component

1304

↓

Partition the instance of the component by generating program code defining one or more kernels corresponding to the instance of the component, wherein the partitioning is based on a defined performance metric of the component and a defined performance requirement of the application

1306

↓

Transform the application by replacing the instance of the component with the program code generated by the partitioning

1308

↓

Compile the application, as transformed, into program code executable by the DPE array.

1310

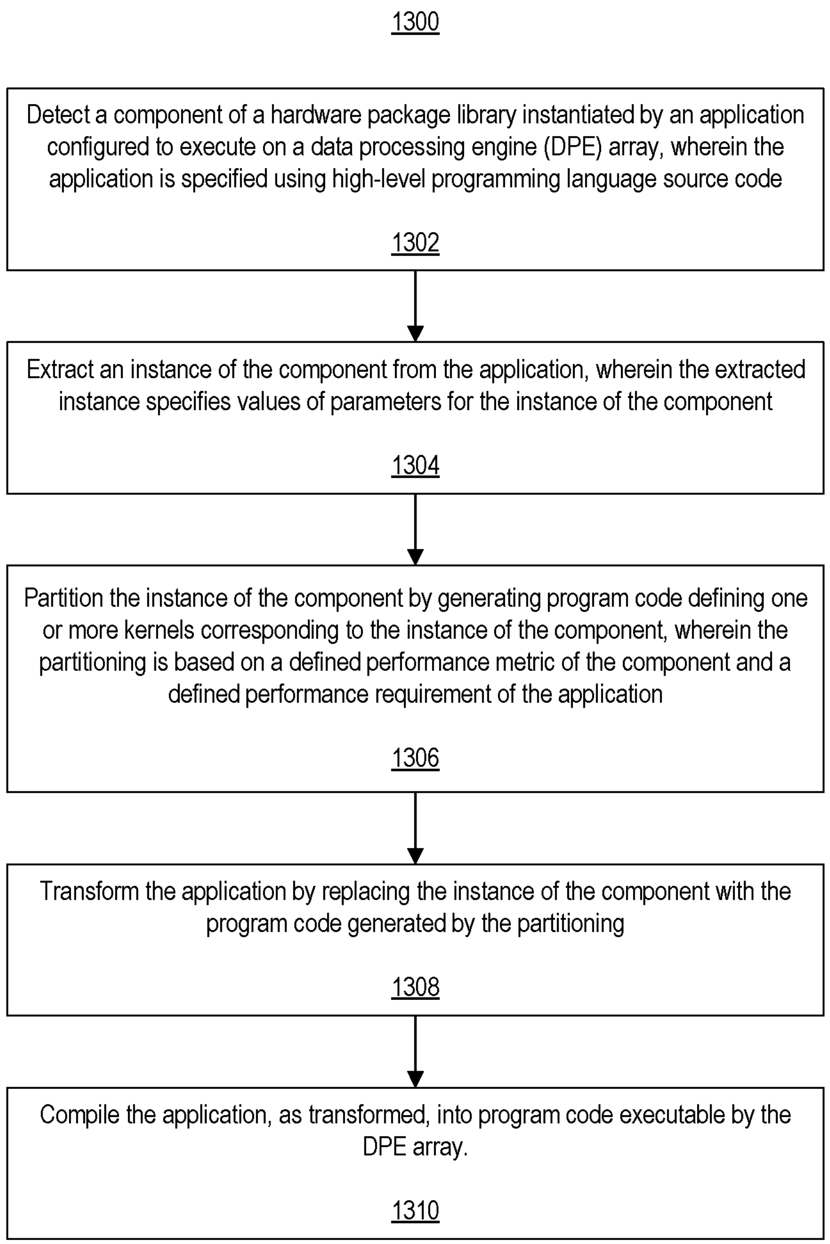

FIG. 13

SYNTHESIS FLOW FOR DATA PROCESSING ENGINE ARRAY APPLICATIONS RELYING ON HARDWARE LIBRARY PACKAGES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits that include data processing engine arrays and, more particularly, to developing applications that rely on hardware library packages for execution in a data processing engine array.

BACKGROUND

A "hardware library package" refers to an assemblage of files and information about those files that is usable to program or configure a hardware resource available on an integrated circuit. A hardware library package may be specified in a high-level programming language and may be tailored to a specific hardware resource. For example, the hardware library package may be specified using object-oriented source code such as templatized C++ source code. The hardware library package encapsulates commonly used functionality for a particular field of endeavor or a particular domain. In developing an application intended to run or execute on the hardware resource, a designer may incorporate functions of the hardware library package into the application.

SUMMARY

In one or more example implementations, a method can include detecting, using computer hardware, a component of a hardware library package instantiated by an application. The application is specified in source code and is configured to execute on a data processing engine (DPE) array. The method can include extracting, using the computer hardware, an instance of the component from the application. The extracted instance specifies values of parameters for the instance of the component. The method can include partitioning, using the computer hardware, the instance of the component by generating program code defining one or more kernels corresponding to the instance of the component. The partitioning is based on a defined performance metric of the component and a defined performance requirement of the application. The method can include transforming, using the computer hardware, the application by replacing the instance of the component with the program code generated by the partitioning. The application, as transformed, can be compiled into program code executable by the DPE array.

In one or more example implementations, a system includes one or more processors configured to initiate operations. The operations can include detecting a component of a hardware library package instantiated by an application. The application is specified in source code and is configured to execute on a DPE array. The operations can include extracting an instance of the component from the application. The extracted instance specifies values of parameters for the instance of the component. The operations can include partitioning the instance of the component by generating program code defining one or more kernels corresponding to the instance of the component. The partitioning is based on a defined performance metric of the component and a defined performance requirement of the application. The operations can include transforming the application by replacing the instance of the component with the program code generated by the partitioning. The application, as transformed, can be compiled into program code executable by the DPE array.

In one or more example implementations, a computer program product includes one or more computer readable storage media, and program instructions collectively stored on the one or more computer readable storage media. The program instructions are executable by computer hardware to initiate operations. The operations can include detecting a component of a hardware library package instantiated by an application. The application is specified in source code and is configured to execute on a DPE array. The operations can include extracting an instance of the component from the application. The extracted instance specifies values of parameters for the instance of the component. The operations can include partitioning the instance of the component by generating program code defining one or more kernels corresponding to the instance of the component. The partitioning is based on a defined performance metric of the component and a defined performance requirement of the application. The operations can include transforming the application by replacing the instance of the component with the program code generated by the partitioning. The application, as transformed, can be compiled into program code executable by the DPE array.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates example source code defining a dataflow subgraph of an application.

FIG. 4 illustrates source code specifying an example application programming interface (API) for a component of a hardware library package that may be instantiated by an application for a DPE array.

FIG. 5 illustrates example control source code usable by a compiler for interpreting a dataflow subgraph of an application for a DPE array.

FIG. 6 illustrates an example of an instance of a component of a hardware library package as extracted from an application.

FIG. 7 illustrates an example of synthesized source code generated during the partitioning operation of FIG. 2.

FIG. 8 illustrates an example of an application for a DPE array as transformed by the EDA system.

FIG. 13 is another example method of synthesizing an application for implementation in a DPE array of an integrated circuit.

DETAILED DESCRIPTION

Figure 1:
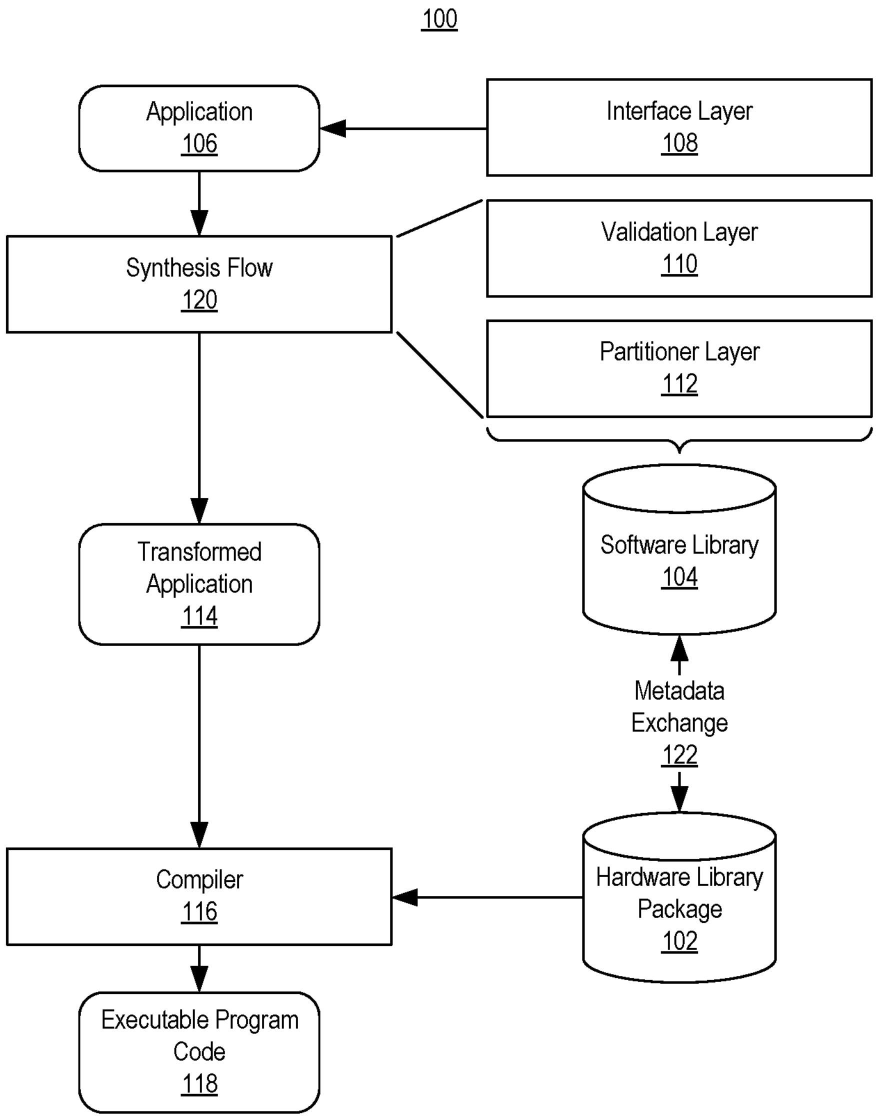
FIG. 1 illustrates certain operative features of an example electronic design automation (EDA) system in accordance with the inventive arrangements described herein.

This disclosure relates to integrated circuits (ICs) that include data processing engine (DPE) arrays and, more particularly, to developing applications that rely on hardware library package(s) for execution in a DPE array. An application developed to execute on a DPE array may include components from one or more available hardware library packages. These components provide a variety of commonly used functions that are often specific to a particular domain. In order for the components to operate as intended within the application, the components must be properly configured with a number of different parameters. These parameters, for example, may indicate how many kernels are to be used to implement each component instance in the DPE array at runtime of the application.

When incorporating a component within an application, the parameters of the component instance from the hardware library package must be specified with a great deal of care to meet the established design requirements of the application while also abiding by the hardware limitations of the DPE array. This is a challenging task in that setting the parameters of component instances of the hardware library package for proper operation in the DPE array requires a deep understanding of both the performance of the components themselves and the hardware architecture of the DPE array.

In accordance with the inventive arrangements described within this disclosure, methods, systems, and computer program products are provided that are capable of automatically configuring component instances from a hardware library package for use within a user application intended to execute on a DPE array. The parameters of the component instances may be determined and generated automatically to result in a user application that, when executed in the DPE array, meets established design requirements of the application while also conforming to hardware limitations of the DPE array. The component instances of the application may be partitioned into multiple kernels to run or execute on multiple, different cores of the DPE array in parallel.

As an example, for a given application, the inventive arrangements are capable of determining, for each component instance of the hardware library package included in the application, whether the component instance will be partitioned into one or more different kernels. Further, if partitioned, the particular number of kernels that will be used to implement the component instance in the DPE array at runtime may be determined. The number of kernels used for each component instance meets the established design requirements for the application.

The resulting application is one that may be mapped onto the hardware resources of the DPE array and compiled for execution therein. For example, the resulting application is mapped onto cores and memories of DPEs (e.g., circuit blocks or tiles) of the DPE array. In generating the parameters necessary for the component instances, the user's source code may be transformed into a new version. The new or updated version of the application may be compiled to generate the binary code that is loaded into the DPE array and executed therein by the respective cores.

FIG. 1 illustrates certain operative features of an EDA system 100. EDA system 100 may be implemented as a data processing system, e.g., a computer, executing suitable program code to perform the operations described within this disclosure. An example of a data processing system that may be used to implement EDA system 100 is described in connection with FIG. 12. In the example of FIG. 1, EDA system 100 provides a software architecture that includes a hardware library package 102, a software library 104 that operates on top of hardware library package 102, a synthesis flow 120, and a compiler 116. EDA system 100 may include other components not illustrated in FIG. 1.

In general, EDA system 100 is capable of processing an application 106 that is intended for execution on a DPE array or other processor array of an IC and generating executable program code 118 that is capable of executing on the DPE array to implement application 106 within the IC. A DPE array includes a plurality of DPEs. Each DPE is implemented as a circuit block or tile. Each DPE may include a core capable of executing program code and a memory. Each core may also include a dedicated instruction or program memory. Examples of DPE arrays are described in connection with FIGS. 9, 10, and 11.

Hardware library package 102 may be implemented as an assemblage of files and information about those files that is usable to program or configure a hardware resource available on an IC such as a DPE array. Hardware library package 102 may also be specified in a High-Level Programming Language (HLPL). For example, hardware library package 102 may be specified using object-oriented source code such as templatized C++ source code or other suitable programming language. Hardware library package 102 is capable of encapsulating commonly used functionality for a particular field of endeavor or a particular domain as one or more components. The components of hardware library package 102 that encapsulate functions are executable by the cores of the DPEs to perform the functions. As an illustrative and non-limiting example, a hardware library package for digital signal processing may include components specified in the HLPL that implement functions such as Finite Impulse Response (FIR) filters, Fast Fourier Transforms (FFTs), and the like. A designer may utilize the components of the hardware library package 102 to create one or more applications, such as application 106, intended to run or execute on the DPE array of the IC.

A "high-level programming language" or "HLPL" refers to a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is.

Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) of a data processing system. Examples of high-level programming languages include, but are not limited to, C, C++, SystemC, OpenCL C, or the like.

Application 106 may be created by a user and may be specified in source code. The source code may be an HLPL. The HLPL used to specify application 106 may be an object-oriented language such as C++. In one aspect, application 106 is specified as a directed flow graph (DFG). Application 106 may include, or reference, one or more component instances from hardware library package 102. For example, application 106 may be written using HLPL source code to specify a graph, e.g., one or more interconnected sub-graphs, that instantiates components of hardware library package 102 and defines how the one or more component instances are connected.

Application 106 is developed to execute on a DPE array of an IC. In one aspect, application 106 may not be compiled by compiler 116 without first undergoing the processing performed by synthesis flow 120. That is, the user description of the design, expressed as application 106, first undergoes processing by synthesis flow 120 that transforms application 106 into a modified version thereof that may be compiled by compiler 116 for execution in the DPE array.

Software library 104 may execute on top of hardware library package 102. In the example, software library 104 includes an interface layer 108, a validation layer 110, and a partitioner layer 112. Interface layer 108 includes various assets, e.g., files, that may be incorporated into application 106. In this manner, interface layer 108 provides input, under the direction of a user, that is used or included within application 106. Each of the validation layer 110 and partitioner layer 112, operating as part of synthesis flow 120, is capable of operating on application 106 prior to compiler 116. Validation layer 110 and partitioner layer 112, for example, contribute to the generation of transformed application 114. Compiler 116 is capable of compiling transformed application 114 into executable program code (e.g., object code specified as one or more binary files) executable by tiles of the DPE array.

In one or more example implementations, interface layer 108 may include one or more HLPL header files (e.g., C++ header files) that include declarations for the components of hardware library package 102. The declarations may correspond to different versions of the components included in hardware library package 102. A user developing application 106 may include selected ones of the header files within application 106. Continuing with the signal processing example, the declarations may specify the application programming interface (API) for a single-data rate type of FIR filter, an interpolation filter, or other types of filters and/or components from hardware library package 102 capable of performing signal processing. A user, for example, may utilize interface layer 108 within application 106 by instantiating a component from hardware library package 102 in application 106 using the API specified by the header file(s).

Within this disclosure, signal processing is used as an example to illustrate the functionality that may be encapsulated by the various components of a hardware library package. It should be appreciated that a hardware library package may encapsulate functionality of other domains and that the example implementations described within this disclosure are not intended to be limited by the particular examples provided.

As noted, validation layer 110 and partitioner layer 112 may be executed as part of synthesis flow 120. Validation layer 110 is capable of analyzing application 106 and detecting parameter values for instantiated components that are unsupported by the respective components. In one aspect, validation layer 110 may be specific to hardware library package 102 and may be built on top of a metadata framework corresponding to the hardware library package 102. The metadata framework, facilitates one or more design rule checks that may be performed by validation layer 110 that must be met for instances of the various components of the hardware library package 102 to operate as intended once implemented in an IC. In the example of FIG. 1, the metadata framework is illustrated as metadata exchange 122 between software library 104 and hardware library package 102 where software library 104 is capable of obtaining metadata stored in hardware library package 102 for the components of hardware library package 102 used in application 106 to enable the design rule checks performed by validation layer 110.

For example, validation layer 110 is capable of performing design rule checks by comparing the parameter values of the instantiated components to expected or correct parameter values for the instantiated components as specified by metadata obtained from the hardware library package 102 via metadata exchange 122 to detect illegal or unsupported parameter values or combinations of parameter values for instantiated components of hardware library package 102 in application 106. In one or more example implementations, the metadata framework may be scaled to support other hardware library packages.

Partitioner layer 112 is capable of partitioning instances of components in application 106 into one or more kernels to support parallel execution of the component instances of application 106 across multiple cores of the DPE array. In general, partitioner layer 112 is capable of comparing established performance requirements for application 106 with the capabilities of instantiated components and partitioning the instantiated components to meet the established performance requirements of application 106. Partitioner layer 112 is capable of determining the capabilities of the instantiated components by reading the appropriate metadata from hardware library package 102 via metadata exchange 122. Partitioner layer 112 is capable of generating transformed application 114.

Compiler 116 is capable of compiling transformed application 114 to generate executable program code 118. Executable program code 118 is capable of executing in the DPE array of the IC. For example, executable program code 118 may be object code specified as one or more binary files that may be loaded into respective DPEs of the DPE array to which the kernels and/or data structures are mapped for execution.

Figure 2:
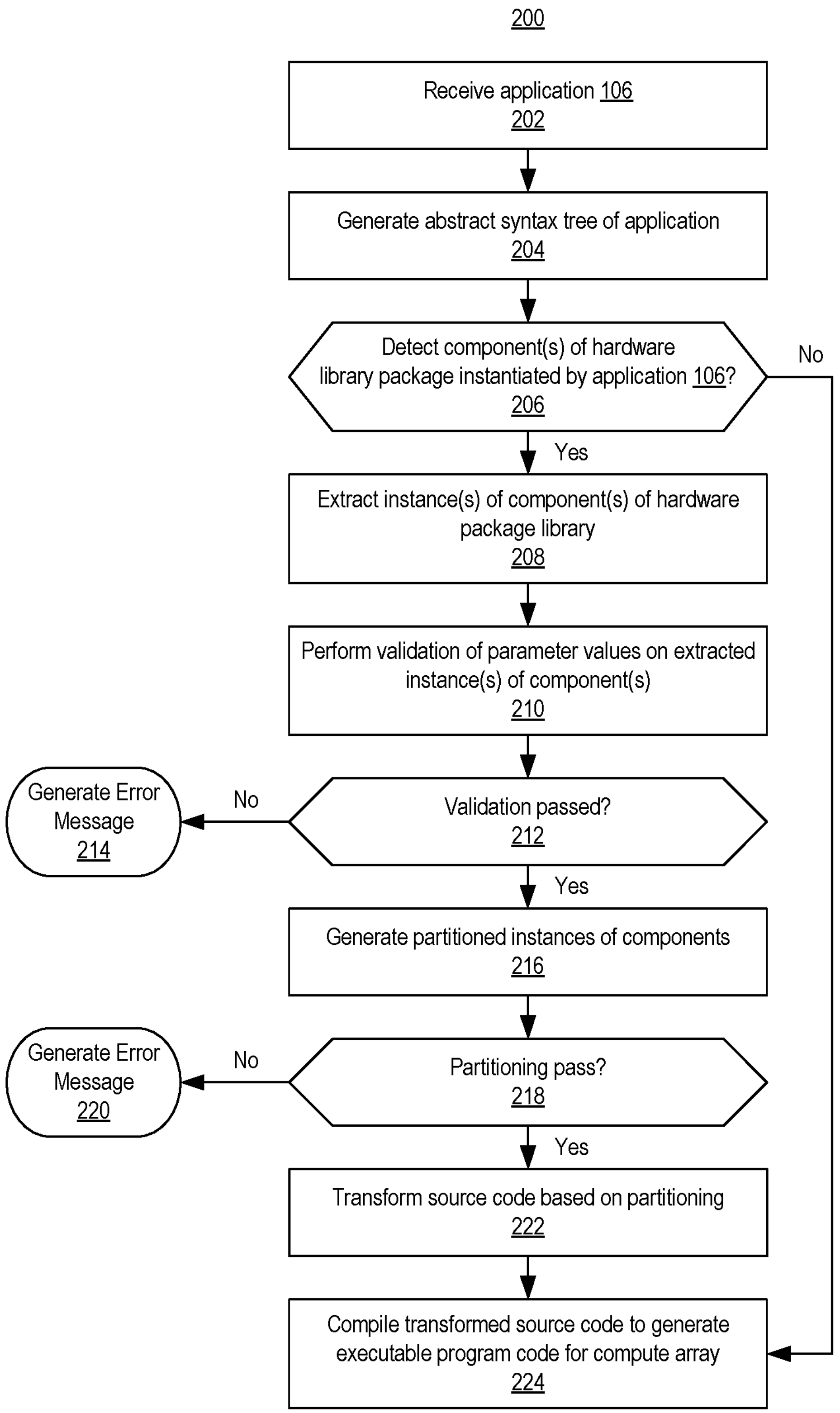
FIG. 2 illustrates an example method of synthesizing an application for implementation in a data processing engine (DPE) array of an integrated circuit.

FIG. 2 illustrates an example method 200 of synthesizing an application for implementation in a DPE array of an IC. Method 200 may be performed by EDA system 100 described in connection with FIG. 1 to process application 106. In one aspect, method 200 illustrates example operations performed as part of synthesis flow 120. Application 106 instantiates one or more components of hardware library package 102. Method 200 illustrates how EDA system 100 is capable of automatically configuring the instantiated components to execute on multiple cores of the DPE array in parallel.

For purposes of illustration, method 200 is described largely in the context where application 106 includes an instance of a component of a hardware library package. It should be appreciated that application 106 may include a single instance of a single component, a single instance of each of a plurality of different components, multiple instances of a single component, multiple instances of a plurality of different components, or various combinations of the foregoing. Further, the instantiated component(s), though described as being from hardware library package 102, may be from a plurality of different hardware library packages.

In block 202, the EDA system 100 receives application 106 for processing. Application 106 may be formed of one or more source code files. For purposes of illustration, FIG. 3 illustrates example source code defining a dataflow subgraph that may be included in application 106. At line 15, the source code of FIG. 3 instantiates an example component from hardware library package 102. The example component is a single-rate asymmetric FIR filter called "filter1." The "filter1" instance is instantiated using the interface class "FirSrAsym" provided by interface layer 108 defined in the "dsplib/fir.h" header file specified at line 5. The input and output ports of the data flow subgraph are connected to the "filter1" input and output ports respectively at lines 19-20.

FIG. 4 illustrates example source code specifying an API for the example FIR filter component instantiated in the example of FIG. 2. The parameters of the component are described in greater detail in Table 1.

TABLE 1

| Parameter | Type | Description | Valid-Values/Range |
|---|---|---|---|
| DataType | Typename | Data type | int16, cint16, int32, cint32, float, cfloat |
| CoefType | Typename | Coefficient Type | int16, cint16, int32, cint32, float, cfloat |
| FirLength | Int | The number of coefficients | 4 to 240 |
| Shift | Int | The number of bits to shift accumulation down by before output | 0 to 61 |
| RoundMode | Int | Round mode | 0 = truncate or floor<br>1 = ceiling (round up)<br>2 = positive infinity<br>3 = negative infinity<br>4 = symmetrical infinity<br>5 = symmetrical to zero<br>6 = convergent to even<br>7 = convergent to odd |
| InputWindowSize | Int | The number of samples in the input window | 4 to 8192 |

FIG. 4 illustrates an example of a header file of interface layer 108. The user may incorporate the source code of FIG. 4, for example, into application 106. In this manner, through inclusion of selected header files in application 106, interface layer 108 is capable of exposing the APIs of the components of hardware library package 102 instantiated in application 106. The dataflow subgraph in the example of FIG. 3 instantiates a single-rate asymmetric FIR filter having the parameter values as listed below in Table 2.

TABLE 2

| Parameter | Value |
|---|---|
| Instance | filter1 |
| classname | xf::aiesynth::fir::FirSrAsym |

TABLE 2-continued

| Parameter | Value |
|---|---|
| Data-type | int32 |
| Coeftype | int32 |
| FirLength | 16 |
| Shift | 0 |
| RoundMode | 0 |
| InputWindowSize | 256 |
| Tap Coefficients | 1, 2, 3, 4, 5, 6, 7, 8, 9, 10, 11, 12, 13, 14, 15, 16 |
| Sampling Rate | 200 mega-samples-per-second (MSPS) |

FIG. 5 illustrates example control source code usable by compiler 116 for interpreting a dataflow subgraph of an application for a DPE array. Control source code may be compiled for execution by a processor to control execution of application 106 (e.g., a graph) when compiled and implemented on the DPE array. For example, the control program (e.g., as compiled from the control source code), when executed, may control when application 106 executes, the number of iterations of application 106 (e.g., the number of iterations of the graph), and when the application 106 stops executing. The control program generated can execute on a processor that is in communication with the DPE array, whether such processor is embedded in the same IC as the DPE array and/or is included in a host data processing system communicatively linked to the IC including the DPE array.

The example control source code of FIG. 5 provides connections indicating to compiler 116 how data should be read into the dataflow subgraph and read out from the dataflow subgraph. The main class includes control APIs for initializing the graph (e.g., init( )), running the graph (e.g., run( )), and ending the graph (e.g., end( )). The control source code of FIG. 5 contains the corresponding top-level application, which instantiates "g" the dataflow subgraph and connects the input/output ports of "g" to the platform ports (e.g., IC I/Os) via file Input/Output (I/O). In this case, the files are "In1.txt" and "Out1.txt" respectively.

In block 204, the EDA system is capable of generating an intermediate version of the application 106. In one aspect, the intermediate version is an Abstract Syntax Tree (AST) generated from the source code of application 106. The AST may be generated using any of a variety of different compilation tools that may be incorporated into EDA system 100. As an example, EDA system 100 may use or include an LLVM compiler with a Clang C/C++ language Frontend that is capable of generating the AST from application 106.

As used within this disclosure, the term "abstract syntax tree" or "AST" means a data structure that specifies a syntactic structure of source code. An AST may have a tree structure where each node represents or denotes a construct occurring in the source code. An AST need not represent every detail appearing in the original source code. For purposes of illustration, in an AST, parenthesis from the source code may be omitted since these are implicit in a tree structure. Further, a construct such as an if-then statement may be represented as a single node having multiple branches. Each node may have a type indicating what the node represents. For example, a node may have a type such as "Literal" corresponding to an actual value or "Call Expression" indicating a function call. A node with type "Literal" may include a value while a "Call Expression" type node may include additional information such as the callee and a list of arguments being provided to the callee.

In block 206, the EDA system 100 determines whether any components of the hardware library package 102 have been instantiated by application 106. For example, the EDA system 100 is capable of traversing the AST to detect instantiations of components of the hardware library package 102. In one aspect, the EDA system 100 is capable of traversing the AST using available APIs from the aforementioned compilation tools. In response to detecting that application 106 instantiates one or more components therein, method 200 continues to block 208. In response to determining that the application 106 does not include any components of the hardware library package instantiated therein, method 200 continues to block 224.

In block 208, the EDA system 100 is capable of extracting instance(s) of the component(s) of the hardware library package 102 detected in the AST. In one aspect, the EDA system 100 is capable of extracting each instance of a component into one or more files or each instance in a separate file. FIG. 6 illustrates an example of the instance "fir1::filter1" as extracted from the AST. In the example of FIG. 6, the instance is extracted from the AST and stored as a JSON file for subsequent use.

In block 210, the EDA system is capable of performing validation on the extracted component instance(s). For example, the extracted component instance(s) may be provided to the validation layer 110. Validation layer 110 is capable of performing one or more design rule checks on the extracted component instance(s) to detect possible errors early in the design process, e.g., prior to compilation.

As an illustrative and non-limiting example, in the case of the extracted component instance of FIG. 6, the EDA system 100 is capable of checking for consistent data types. That is, the FIR filter specified is a 10-tap filter having 10 tap coefficients. The input specified for the FIR filter should match the specified coefficient type as determined from the metadata for the FIR filter obtained from hardware library package 102. If, for example, the user specifies int16 (integer) as the input data type for the filter, but tap coefficients as cint16 or cint32 (e.g., complex coefficients), validation layer 110 detects an unsupported condition with the parameter values and generates an error message in block 214.

Accordingly, in block 212, the EDA system 100, e.g., validation layer 110, determines whether the extracted component instance(s) pass validation. In response to determining that the extracted component instance(s) passed validation, method 200 continues to block 216. In response to determining that the extracted component instance(s) did not pass validation, method 200 may continue to block 214 where the validation layer 110 generates an error message that may be output to the user. The error message generated in block 214 may provide the user with specific information indicating the component instance(s) that did not pass and the specific parameter value(s) that did not pass the design rule checks. It should be appreciated that an application such as application 106 may include one or more instances of one or more different components from one or more different hardware library packages. Accordingly, the error message generated in block 214 may indicate the particular hardware library package, component, and instance that did not pass validation and the particular design rule check that was not passed.

The design rule checks performed by validation layer 110 may be used in any of a variety of different development environments including those that provide a Graphical User Interface (GUI) through which a user may create a design as a block diagram or model. In such development environments, an application (e.g., a model) may be validated during creation or the design process prior to compilation.

In block 216, the EDA system 100, e.g., partitioner layer 112, is capable of generating partitioned instances of the component. In block 216, partitioner layer 112 is capable of comparing a performance requirement of application 106 with the capabilities of the instantiated component. Partitioner layer 112 is capable of partitioning the instance of the component to meet the performance requirement of application 106 based, at least in part, on the capabilities of the component as determined from the metadata for the component from the hardware library package 102. In some cases, for example, the instance of the component may require partitioning into a plurality of kernels to achieve the performance requirement for application 106. Based on the partitioning that is needed, partitioner layer 112 is capable of generating source code implementing the instance of the component.

For purposes of illustration, consider the example of FIG. 2 having parameter values as specified in Table 2. The sampling rate (e.g., data throughput) for the instance "filter1" is 200 MSPS. Thus, in this example, the performance requirement for the application 106 is 200 MSPS. Partitioner layer 112 is capable of comparing the stated performance requirement to the capabilities of the component. The component capabilities may be specified within hardware library package 102 as part of the metadata for the component contained therein. For purposes of illustration, the component also has the capability of 200 MSPS. In this example, the performance requirement matches the capability of the component. Accordingly, the partitioner layer 112 determines that one kernel is capable of meeting the performance requirement.

As part of the partitioning, partitioner layer 112 generates the example source code of FIG. 7 in response to determining the number of kernels needed to meet the performance requirement specified for the component instance. The number of kernels to be used for partitioning the component instance may be specified at line 18 as the "*filter_kernels" parameter. In this example, the value of 1 is assigned to "*filter_kernels." The example source code of FIG. 7 illustrates synthesized source code implementing a single kernel corresponding to the instance "filter1." The source code of FIG. 7 generated by partitioner layer 112 is the dataflow subgraph corresponding to instance "filter1." The "filter1" instance, as originally specified by the user in application 106, is transformed into the graph class of FIG. 7.

Line 21 of FIG. 7 specifies a runtime ratio. Runtime ratio is specified on a per kernel basis. The value of the runtime ratio indicates the amount of processing time of a core that is to be occupied by a given kernel. In the example of FIG. 7, the kernel has a runtime ratio of 0.752344, meaning that the kernel is to require approximately 75% of the runtime capacity of the core to which the kernel is mapped and in which the kernel will execute. In the case where more kernels are to be used in the partitioning of a component instance, the runtime ratio may be adjusted. For example, the runtime ratio may be increased.

In another example, consider the case where the performance requirement of application 106 is 600 MSPS. That is, the instance "filter1" is to provide 600 MSPS. In that case, the partitioner layer 112 determines that the component instance is unable to meet the performance requirement of the application 106. The partitioner layer 112 partitions the component instance into three different kernels, where each kernel processes ⅓ of the filter taps and, when taken collectively operating in a pipeline arrangement, provides a performance of 600 MSPS. The kernels may be cascaded (e.g., pipelined) to provide performance requirement of 600 MSPS.

In the example where the desired performance is 600 MSPS, requiring 3 kernels to achieve the desired performance, the value assigned to the "*filter_kernels" in the source code of FIG. 7 will be 3. The runtime ratio also may be adjusted upward or downward. As an illustrative example, the runtime ratio may be increased to approximately 0.8.

In block 218, the EDA system 100, e.g., partitioner layer 112, optionally determines whether the partitioned component instances pass one or more design rule checks. Partitioner layer 112, for example, is capable of determining whether the resulting combination of kernels is supported. As an illustrative and non-limiting example, in the user application, an FIR filter may require a certain length, e.g., 10 taps, to achieve the minimum performance. The partitioner layer 112 may partition the instance into two 5 tap FIR filters to achieve the desired performance. For purposes of illustration, the FIR filter component from hardware library package 102 may require a minimum of 5 taps. A configuration of less than 5 taps is not supported by the component per the metadata for the FIR filter. Accordingly, the partitioning of the component instance into two 5 tap kernels would be supported. A partitioning of instance "filter1" into 5 kernels of 2 taps each would not be supported and would fail partitioning. In that case, method 200 would continue to block 220 to generate an error message indicating the particular partitioning operation (e.g., instance and component) for which the failure was detected.

As another illustrative and non-limiting example, there may be an upper limit on the number of certain kernels that can be connected in a cascade (e.g., pipelined) configuration. The upper limit may be specified for the kernel as part of the metadata for the component in the hardware library package 102. Appreciably, the lower limit may be 1. For example, in the case of a FIR filter, the lower limit may be 1 while the upper limit is 9. In an example implementation where the FIR filter has 100 taps, if the required performance is not met using the maximum cascade length value (e.g., 9 in this example), partitioner layer 112 generates an error.

In block 222, the EDA system 100, e.g., partitioner layer 112, is capable of transforming application 106 to produce source code defining the dataflow subgraph that will be compiled by compiler 116. The transformation of block 222 effectively replaces the dataflow subgraphs of component instances specified by the user with EDA system 100 generated source code that references the source code generated in block 216.

For purposes of illustration, the EDA system 100 replaces the source code of application 106 corresponding to FIG. 3 with the generated source code of FIG. 8. Whereas the source code of FIG. 3 included a reference to the API of the component (e.g., "FirSrAsym") being instantiated, the source code of FIG. 8 refers to the specific dataflow subgraph generated in block 216 illustrated in FIG. 7. Line 9 of FIG. 8, for example, includes the dataflow subgraph of FIG. 7 for purposes of compilation (e.g., as opposed to the interface header as was included in the source code of FIG. 3). As such, the compiler 116 receives the definition of the dataflow subgraph of FIG. 7. The source code of FIG. 8 transforms the instantiation of "filter1" into an instantiation of the generated graph class of FIG. 7 with the number of kernels as previously determined. Line 20 of FIG. 8 is the constructor that instantiates the generated graph class "filter1." Because the sampling rate has been set based on the number of kernels that are to be used from the partitioning (e.g., 1 kernel in this case), the sampling rate is set. That is, the sampling rate is set by virtue of the number of kernels to be used. Accordingly, the constructor of line 20 of FIG. 8 passes only the "taps" to the "filter1" graph class instance.

In block 224, the EDA system 100, e.g., compiler 116, is capable of compiling the transformed source code from block 222 into executable program code that may be loaded into, and executed by, the DPE array. Appreciably, block 224, being performed by compiler 116, may be considered separate from synthesis flow 120 of FIG. 1. In general, compiler 116 is capable of taking the transformed source code (e.g., the example source code of FIG. 8 referencing the example source code of FIG. 7) and the hardware library package 102 as input. Compiler 116 operates on the transformed source code to generate a dataflow graph that defines the kernels to be implemented and the communication links between the kernels. The dataflow graph includes nodes representing kernels and edges representing communication between the kernels.

Compiler 116 is capable of mapping (e.g., placing), based on the dataflow graph, kernels to particular DPEs and to particular cores of the DPEs. Compiler 116 maps data structures of the kernels onto memories of the DPEs. Compiler 116 is capable of allocating kernels to cores of DPEs based, at least in part, on the specified runtime ratio of each kernel. That is, more than one kernel may be assigned to the same core presuming that the total runtime ratios of the kernels assigned to the core do not exceed a threshold (e.g., 1 in this example). Compiler 116 also accounts for architectural features and/or limitations of the DPE array in mapping the transformed application thereto. For example, the DPE array must include a sufficient number of cores to which kernels may be mapped, sufficient memory to which buffers may be mapped, etc. Compiler 116 further is capable of generating the executable program code as one or more binary file(s) to be executed by the respective DPE tiles (e.g., to be executed by the respective cores of the DPE tiles) based on the above-described source code, the components of the hardware library package 102, and the aforementioned mapping.

In cases where the IC including the DPE array also includes other resources, compiler 116 is capable of routing communication channels between the DPE array and the other resources of the IC. For example, the compiler 116 is capable of generating configuration data that programs any programmable resources such as programmable logic and/or a programmable network-on-chip (NoC) of the IC to establish communication channels. Compiler 116, in general, is capable of generating the object code to be loaded into the different DPEs of the DPE array and/or any configuration data needed to configure other resources of the IC so that the dataflow graph may be executed by the DPE array.

In the example of FIG. 2, one instance of a component was discussed for purposes of illustration. It should be appreciated that in cases where multiple instances of one or more components from one or more hardware library packages are included in the user application, there will be a plurality of performance requirements. The performance requirements will vary from one instance of a component to another with partitioning decisions being made on a per instance basis. That is, the performance requirements, though described as belonging to application 106, may be component instance specific performance requirements that influence the partitioning performed for each of the component instances.

Figure 9:
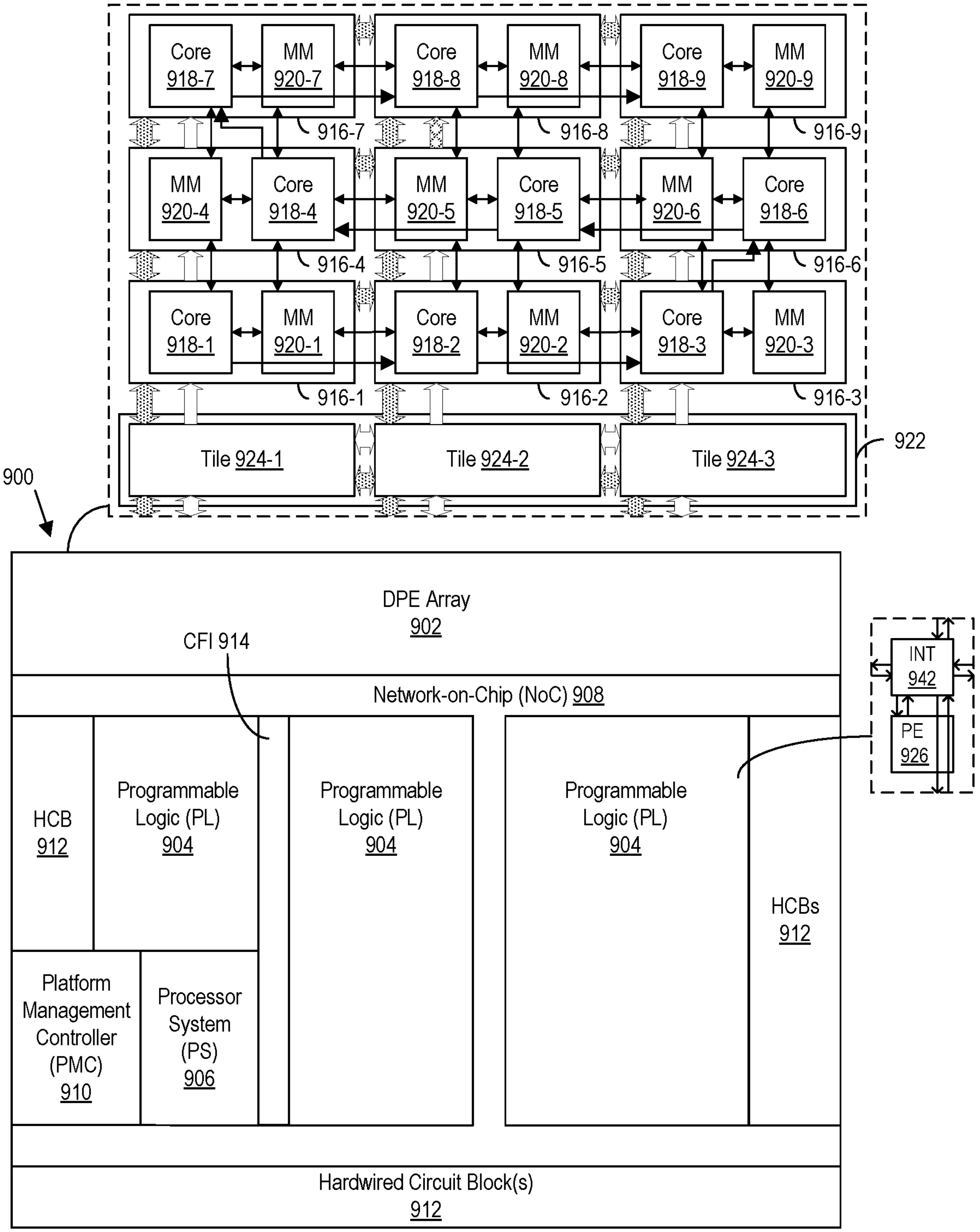
FIG. 9 illustrates an example architecture for an integrated circuit including a DPE array.

FIG. 9 illustrates an example architecture for an IC 900 having a DPE array 902. IC 900 is an example of a programmable IC and an adaptive system. In one aspect, IC 900 is also an example of a System-on-Chip (SoC). In the example of FIG. 9, IC 900 is implemented on a single die provided within a single integrated package. In other examples, IC 900 may be implemented using a plurality of interconnected dies where the various programmable circuit resources illustrated in FIG. 9 are implemented across the different interconnected dies.

In the example, IC 900 includes DPE array 902, programmable logic (PL) 904, a processor system (PS) 906, a Network-on-Chip (NoC) 908, a platform management controller (PMC) 910, and one or more hardwired circuit blocks 912. A configuration frame interface (CFI) 914 is also included. It should be appreciated that the architecture of IC 900 is provided for purposes of illustration and not limitation. An IC for use with the inventive arrangements described herein may include DPE array 902 along or with any combination of the various subsystems described.

DPE array 902 is implemented as a plurality of interconnected and programmable DPEs 916. DPEs 916 may be arranged in an array and are hardwired. Each DPE 916 can include one or more cores 918 and a memory module (abbreviated "MM" in FIG. 9) 920. In one aspect, each core 918 is capable of executing program code stored in a core-specific program memory contained within each respective core (not shown). Each core 918 is capable of directly accessing the memory module 920 within the same DPE 916 and the memory module 920 of any other DPE 916 that is adjacent to the core 918 of the DPE 916 in the up, down, left, and right directions. For example, core 918-5 is capable of directly reading and/or writing (e.g., via respective memory interfaces not shown) memory modules 920-5, 920-8, 920-6, and 920-2. Core 918-5 sees each of memory modules 920-5, 920-8, 920-6, and 920-2 as a unified region of memory (e.g., as a part of the local memory accessible to core 918-5). This facilitates data sharing among different DPEs 916 in DPE array 902. In other examples, core 918-5 may be directly connected to memory modules 920 in other DPEs.

DPEs 916 are interconnected by programmable DPE interconnect circuitry. The programmable DPE interconnect circuitry may include one or more different and independent networks. For example, the programmable DPE interconnect circuitry may include a streaming network formed of streaming connections (shaded arrows) and a memory mapped network formed of memory mapped connections (unshaded arrows).

Loading configuration data into control registers of DPEs 916 by way of the memory mapped connections allows each DPE 916 and the components therein to be controlled independently. DPEs 916 may be enabled/disabled on a per-DPE basis. Each core 918, for example, may be configured to access the memory modules 920 as described or only a subset thereof to achieve isolation of a core 918 or a plurality of cores 918 operating as a cluster. Each streaming connection may be configured to establish logical connections between only selected ones of DPEs 916 to achieve isolation of a DPE 916 or a plurality of DPEs 916 operating as a cluster. Because each core 918 may be loaded with program code specific to that core 918, each DPE 916 is capable of implementing one or more different kernels therein.

In other aspects, the programmable DPE interconnect circuitry within DPE array 902 may include additional independent networks such as a debug network and/or an event broadcast network, each being independent (e.g., distinct and separate from) the streaming connections and the memory mapped connections. In some aspects, the debug network is formed of memory mapped connections and/or is part of the memory mapped network.

Cores 918 may be directly connected with adjacent cores 918 via core-to-core cascade connections. In one aspect, core-to-core cascade connections are unidirectional and direct connections between cores 918 as pictured. In another aspect, core-to-core cascade connections are bidirectional and direct connections between cores 918. In general, core-to-core cascade connections generally allow the results stored in an accumulation register of a source core to be provided directly to an input of a target or load core. Activation of core-to-core cascade interfaces may also be controlled by loading configuration data, e.g., part of the compiled application 106, into control registers of the respective DPEs 916.

In an example implementation, DPEs 916 do not include cache memories. By omitting cache memories, DPE array 902 is capable of achieving predictable, e.g., deterministic, performance. Further, significant processing overhead is avoided since maintaining coherency among cache memories located in different DPEs 916 is not required. In a further example, cores 918 do not have input interrupts. Thus, cores 918 are capable of operating uninterrupted. Omitting input interrupts to cores 918 also allows DPE array 902 to achieve predictable, e.g., deterministic, performance.

SoC interface block 922 operates as an interface that connects DPEs 916 to other resources of IC 900. In the example of FIG. 9, SoC interface block 922 includes a plurality of interconnected tiles 924 organized in a row. In particular embodiments, different architectures may be used to implement tiles 924 within SoC interface block 922 where each different tile architecture supports communication with different resources of IC 900. Tiles 924 are connected so that data may be propagated from one tile to another bi-directionally. Each tile 924 is capable of operating as an interface for the column of DPEs 916 directly above and is capable of interfacing such DPEs 916 with components and/or subsystems of IC 900 including, but not limited to, PL 904 and/or NoC 908.

Tiles 924 are connected to adjacent tiles, to DPEs 916 immediately above, and to circuitry below using the streaming connections and the memory mapped connections as shown. Tiles 924 may also include a debug network that connects to the debug network implemented in DPE array 902. Each tile 924 is capable of receiving data from another source such as PS 906, PL 904, and/or another hardwired circuit block 912. Tile 924-1, for example, is capable of providing those portions of the data, whether application or configuration, addressed to DPEs 916 in the column above to such DPEs 916 while sending data addressed to DPEs 916 in other columns on to other tiles 924, e.g., 924-2 or 924-3, so that such tiles 924 may route the data addressed to DPEs 916 in their respective columns accordingly.

PL 904 is circuitry that may be programmed to perform specified functions. As an example, PL 904 may be implemented as field programmable gate array type of circuitry. PL 904 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 904 is highly configurable unlike hardwired circuitry. Each programmable circuit block of PL 904 typically includes a programmable element 926

(e.g., a functional element) and a programmable interconnect 942. The programmable interconnects 942 provide the highly configurable topology of PL 904. The programmable interconnects 942 may be configured on a per wire basis to provide connectivity among the programmable elements 926 of programmable circuit blocks of PL 904 and is configurable on a per-bit basis (e.g., where each wire conveys a single bit of information) unlike connectivity among DPEs 916, for example, that may include multi-bit stream connections capable of supporting packet-based communications.

PS 906 is implemented as hardwired circuitry that is fabricated as part of IC 900. PS 906 may be implemented as, or include, any of a variety of different processor types each capable of executing program code. For example, PS 906 may be implemented as an individual processor, e.g., a single core capable of executing program code. In another example, PS 906 may be implemented as a multi-core processor. In still another example, PS 906 may include one or more cores, modules, co-processors, I/O interfaces, and/or other resources. PS 906 may be implemented using any of a variety of different types of architectures. Example architectures that may be used to implement PS 906 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

In one or more example implementations, PS 906 may execute the control program discussed previously that controls execution of application 106 within DPE array 902.

NoC 908 is a programmable interconnecting network for sharing data between endpoint circuits in IC 900. The endpoint circuits can be disposed in DPE array 902, PL 904, PS 906, and/or selected hardwired circuit blocks 912. NoC 908 can include high-speed data paths with dedicated switching. In an example, NoC 908 includes one or more horizontal paths, one or more vertical paths, or both horizontal and vertical path(s). The arrangement and number of regions shown in FIG. 9 is merely an example. NoC 908 is an example of the common infrastructure that is available within IC 900 to connect selected components and/or subsystems.

Within NoC 908, the nets that are to be routed through NoC 908 are unknown until a user circuit design is created for implementation within IC 900. NoC 908 may be programmed by loading configuration data into internal configuration registers that define how elements within NoC 908 such as switches and interfaces are configured and operate to pass data from switch to switch and among the NoC interfaces to connect the endpoint circuits. NoC 908 is fabricated as part of IC 900 (e.g., is hardwired) and, while not physically modifiable, may be programmed to establish connectivity between different master circuits and different slave circuits of a user circuit design. NoC 908, upon power-on, does not implement any application data paths or routes therein, but may provide default paths for loading configuration data into selected other subsystems. Once configured by PMC 910, however, NoC 908 implements data paths or routes between endpoint circuits.

PMC 910 is responsible for managing IC 900. PMC 910 is a subsystem within IC 900 that is capable of managing the other programmable circuit resources across the entirety of IC 900. PMC 910 is capable of maintaining a safe and secure environment, booting IC 900, and managing IC 900 during normal operations. For example, PMC 910 is capable of providing unified and programmable control over power-up, boot/configuration, security, power management, safety monitoring, debugging, and/or error handling for the different programmable circuit resources of IC 900 (e.g., DPE array 902, PL 904, PS 906, and NoC 908). PMC 910 operates as a dedicated platform manager that decouples PS 906 and from PL 904. As such, PS 906 and PL 904 may be managed, configured, and/or powered on and/or off independently of one another.

Hardwired circuit blocks 912 include special-purpose circuit blocks fabricated as part of IC 900. Though hardwired, hardwired circuit blocks 912 may be configured by loading configuration data into control registers to implement one or more different modes of operation. Examples of hardwired circuit blocks 912 may include input/output (I/O) blocks, transceivers for sending and receiving signals to circuits and/or systems external to IC 900, memory controllers, or the like. Examples of different I/O blocks may include single-ended and pseudo differential I/Os. Examples of transceivers may include high-speed differentially clocked transceivers. Other examples of hardwired circuit blocks 912 include, but are not limited to, cryptographic engines, digital-to-analog converters (DACs), analog-to-digital converters (ADCs), and the like. In general, hardwired circuit blocks 912 are application-specific circuit blocks.

CFI 914 is an interface through which configuration data, e.g., a configuration bitstream, may be provided to PL 904 to implement different user-specified circuits and/or circuitry therein. CFI 914 is coupled to and accessible by PMC 910 to provide configuration data to PL 904. In some cases, PMC 910 is capable of first configuring PS 906 such that PS 906, once configured by PMC 910, may provide configuration data to PL 904 via CFI 914.

The various programmable circuit resources illustrated in FIG. 9 may be programmed initially as part of a boot process for IC 900. During runtime, the programmable circuit resources may be reconfigured. In one aspect, PMC 910 is capable of initially configuring DPE array 902, PL 904, PS 906, and NoC 908. At any point during runtime, PMC 910 may reconfigure all or a portion of IC 900. In some cases, PS 906 may configure and/or reconfigure PL 904 and/or NoC 908 once initially configured by PMC 910.

Figure 10:
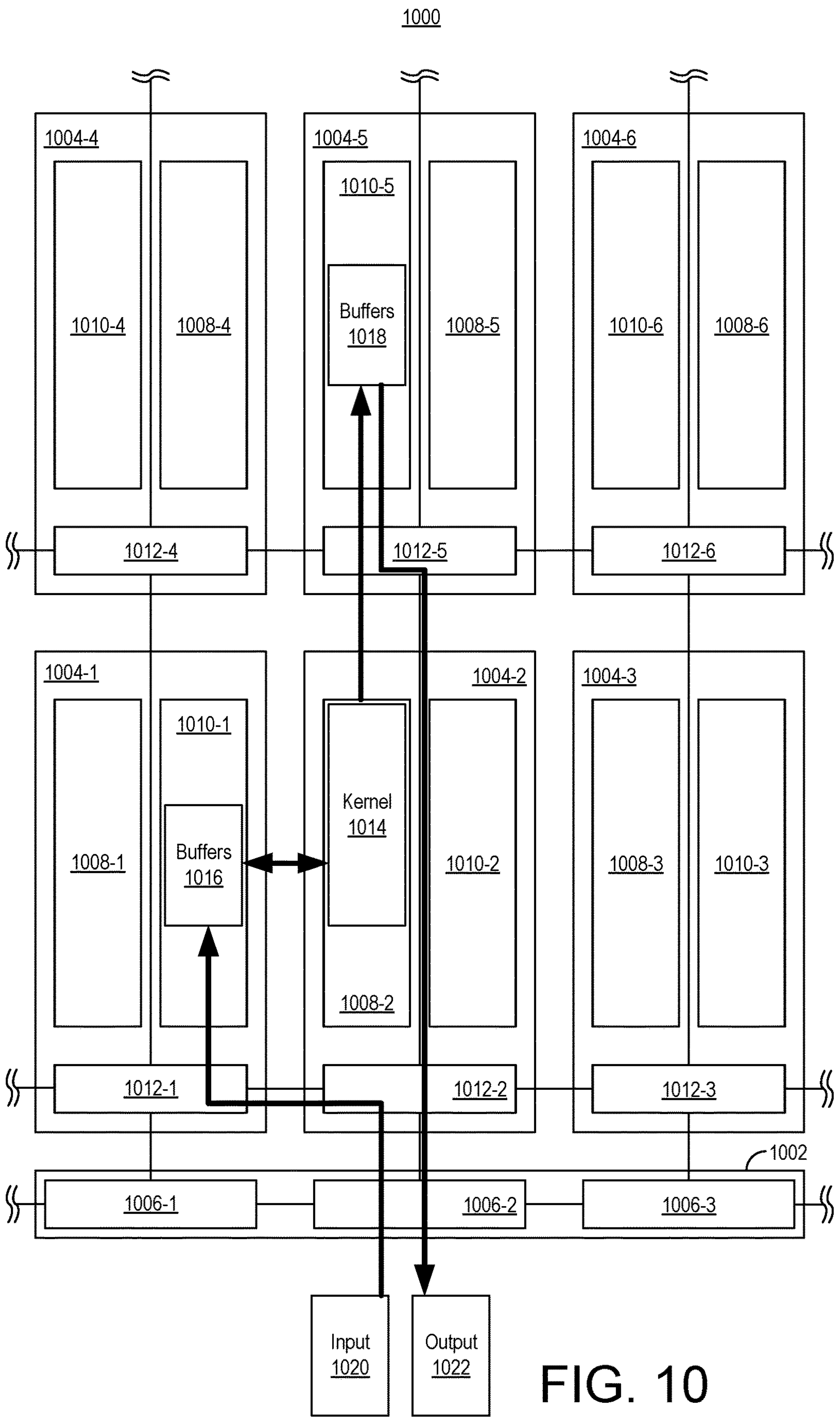
FIG. 10 illustrates an example implementation of an application having one kernel in a DPE array.

FIG. 10 illustrates an example of a DPE array 1000 implementing a version of application 106 using one kernel. DPE array 1000 may be implemented substantially similar to DPE array 902 of FIG. 9. In the example, DPE array 1000 includes SoC interface 1002 and DPEs 1004. SoC interface 1002 includes tiles 1006. Each DPE 1004 includes a core 1008 and a memory 1010. Memories 1010 may include a plurality of different banks (not shown) to which buffers may be allocated. Each DPE 1004 includes interconnect circuitry 1012. Interconnect circuitry 1012, for example, may include a memory mapped switch and a stream switch. At runtime, e.g., once DPE array 1000 is configured, the connections illustrated correspond to stream interconnects established by the respective stream switches of interconnect circuitry 1012.

The example of FIG. 10 illustrates an example implementation of application 106 with a 200 MSPS design requirement as generated by compiler 116. In the example, the kernel 1014, which may represent executable program code, is mapped to, and executed by, core 1008-2. Each core 1008 may include a separate instruction memory (not shown) that is independent of memories 1010. Executable kernels are loaded into the instruction memories as opposed to memories 1010. In the example of FIG. 10, executable program code corresponding to kernel 1014 is loaded into the instruction memory of core 1008-2 and executed by core 1008-2. As shown, buffers 1016 are allocated to memory 1010-1, while buffers 1018 are allocated to memory 1010-5.

In the example of FIG. 10, input 1020 is provided through tile 1006-2, interconnect circuitry 1012-2, and interconnect circuitry 1012-1 to buffers 1016 in memory 1010-1. Core 1008-2, in executing kernel 1014, accesses buffers 1016 and writes data that is generated through execution of kernel 1014 into buffers 1018. As discussed, cores may directly read and/or write to memories in the same DPE and in adjacent DPEs. Accordingly, core 1018-2 is capable of directly reading and writing memory 1010-1 and memory 1010-5. That is, core 1008-5 may read and write to buffers 1016 and 1018 without utilizing interconnect circuitry 1012. As shown, data may be output via interconnect circuitry 1012-5, interconnect circuitry 1012-2, and tile 1006-2 to output 1022.

Figure 11:
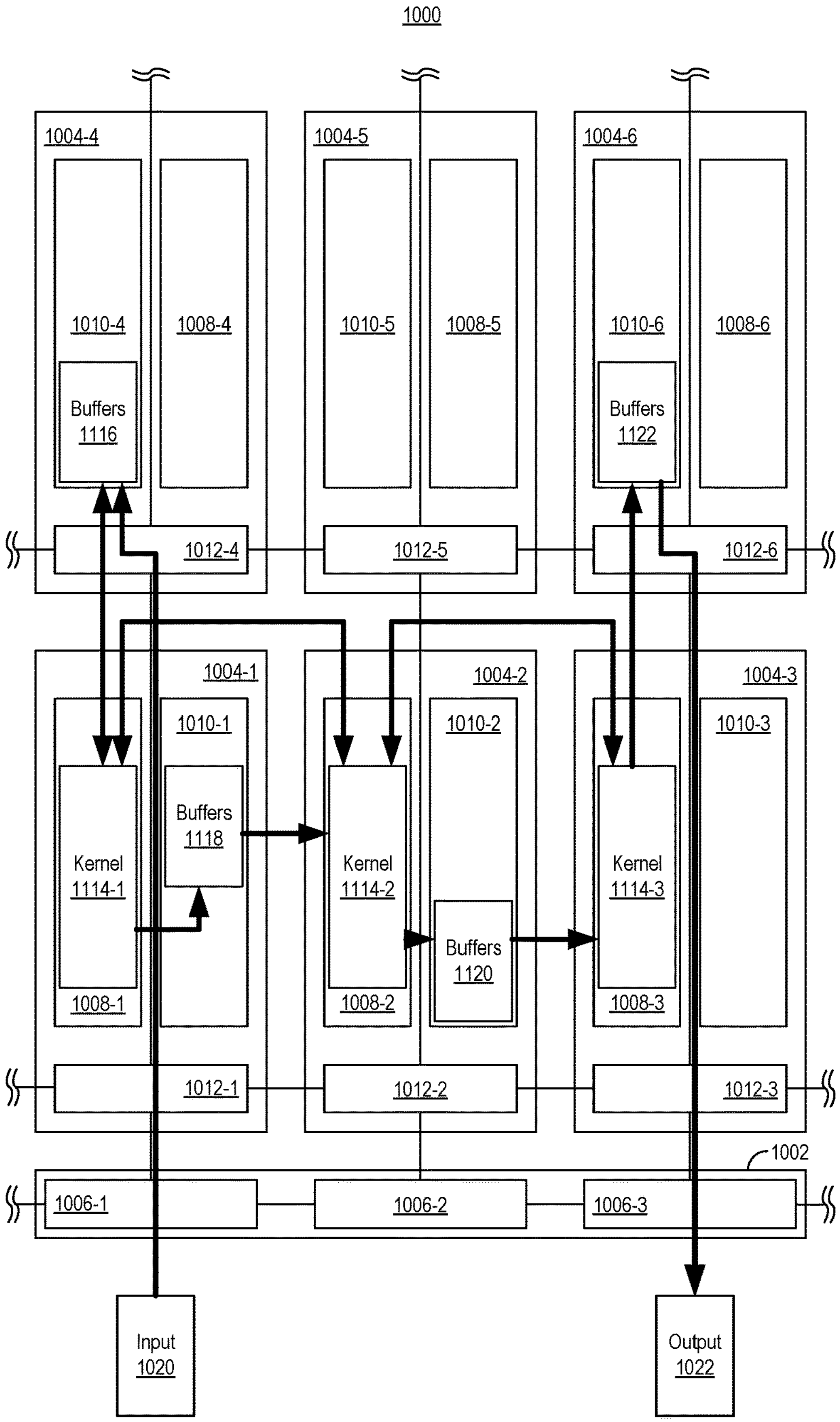
FIG. 11 illustrates an example implementation of an application having a plurality of kernels in a DPE array.

FIG. 11 illustrates an example of DPE array 1000 implementing a version of application 106 using three kernels. The example of FIG. 11 illustrates an example implementation of application 106 having a 600 MSPS design requirement as generated by compiler 116. In the example, the kernels 1114-1, 1114-2, and 1114-3 are cascaded are mapped to cores 1008-1, 1008-2, and 1008-3, respectively. That is, executable program code corresponding to kernel 1114-1 is stored in the instruction memory of core 1008-1 and executed by core 1008-1. Executable program code corresponding to kernel 1114-2 is stored in the instruction memory of core 1008-2 and executed by core 1008-2. Executable program code corresponding to kernel 1114-3 is stored in the instruction memory of core 1008-3 and executed by core 1008-3. Buffers 1116, 1118, 1120, and 1122 are allocated to memories 1010-4, 1010-1, 1010-2, and 1010-6, respectively.

In the example of FIG. 11, input 1020 is provided through tile 1006-1, interconnect circuitry 1012-1, and interconnect circuitry 1012-4 to buffers 1116 in memory 1010-4. Core 1008-1, in executing kernel 1114-1, accesses buffers 1116 in memory 1010-4 and buffers 1118 in memory 1010-1 and is capable of doing so directly via memory interfaces. Kernels 1114-1, 1114-2, and 1114-3 are capable of communicating via cascade connections and/or interconnect circuitry 1012 (e.g., 1012-1, 1012-2, and 1013-3). Further, core 1008-1, in executing kernel 1114-1, is capable of writing directly to buffers 1118 in memory 1010-1 via a memory interface, while core 1008-2, in executing kernel 1114-2, is capable of reading directly from buffers 1118 via another memory interface. Core 1008-2, in executing kernel 1114-2, is capable of writing directly to buffers 1120 in memory 1010-2 via a memory interface while core 1008-3, in executing kernel 1114-3, is capable of reading directly from buffers 1120 via another memory interface and writing directly to buffers 1122 in memory 1010-6 via yet another memory interface. Data may be output from buffers 1122 via interconnect circuitry 1012-6, interconnect circuitry 1012-3, and tile 1006-3 to output 1022.

In the examples of FIGS. 10 and 11, input 1020 and output 1022 may represent other systems and/or circuit components within the IC in which DPE array 1000 is implemented. In one or more example implementations, input 1020 and output 1022 may represent I/O pins, transceivers, or the like.

Figure 12:
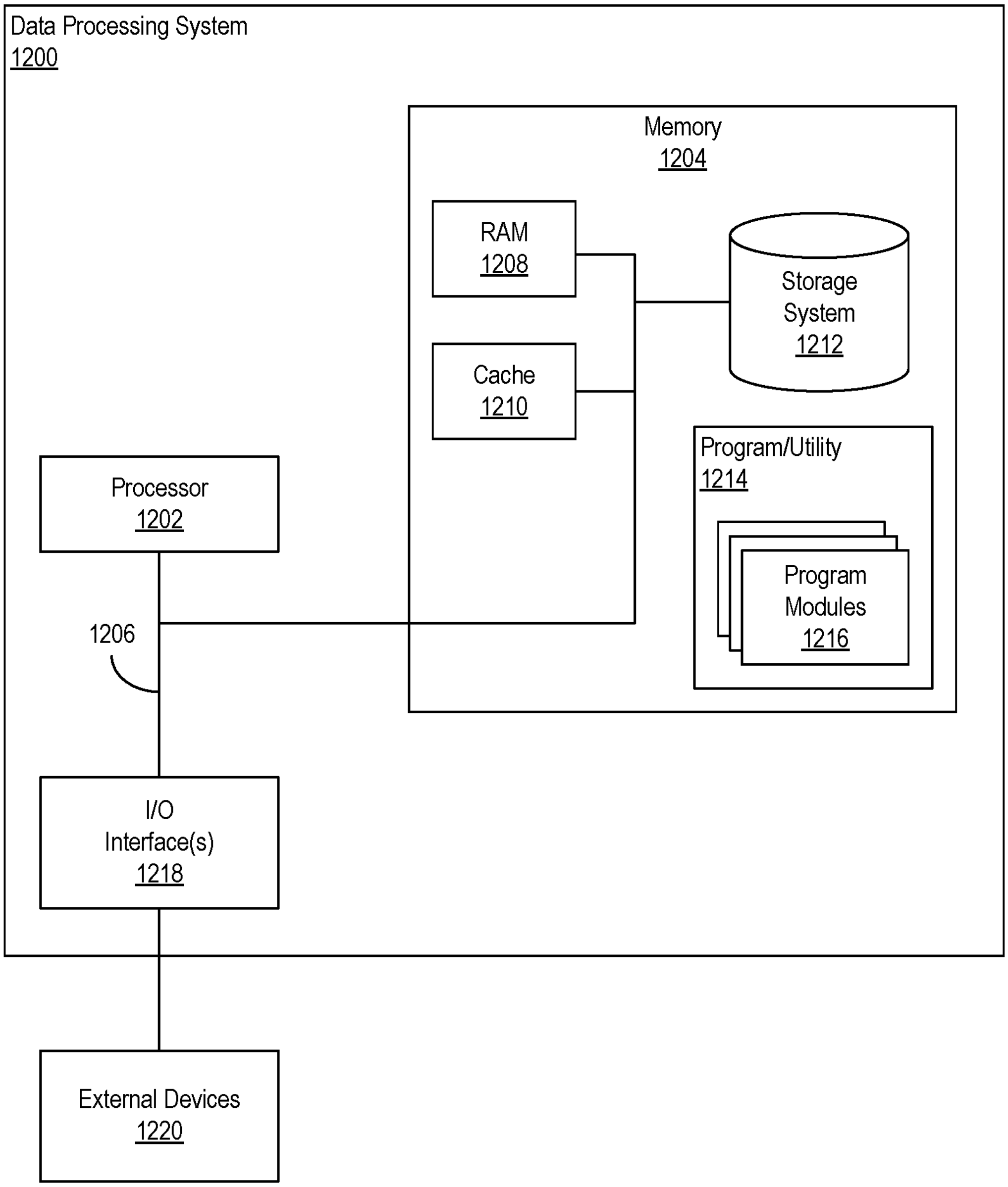
FIG. 12 illustrates an example of a data processing system for use with the inventive arrangements described within this disclosure.

FIG. 12 illustrates an example implementation of a data processing system 1200. As defined herein, "data processing system" means one or more hardware systems configured to process data, each hardware system including at least one processor programmed to initiate operations and memory.

The components of data processing system 1200 can include, but are not limited to, a processor 1202, a memory 1204, and a bus 1206 that couples various system components including memory 1204 to processor 1202. Processor 1202 may be implemented as one or more processors. In an example, processor 1202 is implemented as a central processing unit (CPU). Example processor types include, but are not limited to, processors having an x86 type of architecture (IA-32, IA-64, etc.), Power Architecture, ARM processors, and the like. As defined herein, the term "processor" means at least one circuit capable of carrying out instructions contained in program code. The circuit may be an integrated circuit or embedded in an integrated circuit.

Bus 1206 represents one or more of any of a variety of communication bus structures. By way of example, and not limitation, bus 1206 may be implemented as a Peripheral Component Interconnect Express (PCIe) bus. Data processing system 1200 typically includes a variety of computer system readable media. Such media may include computer-readable volatile and non-volatile media and computer-readable removable and non-removable media.

Memory 1204 can include computer-readable media in the form of volatile memory, such as random-access memory (RAM) 1208 and/or cache memory 1210. Data processing system 1200 also can include other removable/non-removable, volatile/non-volatile computer storage media. By way of example, storage system 1212 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1206 by one or more data media interfaces. Memory 1204 is an example of at least one computer program product.

Program/utility 1214, having a set (at least one) of program modules 1216, may be stored in memory 1204. Program/utility 1214 is executable by processor 1202. By way of example, program modules 1216 may represent an operating system, one or more application programs, other program modules, and program data. Program modules 1216, upon execution, cause data processing system 1200, e.g., processor 1202, to carry out the functions and/or methodologies of the example implementations described within this disclosure. Program/utility 1214 and any data items used, generated, and/or operated upon by data processing system 1200 are functional data structures that impart functionality when employed by data processing system 1200. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

For example, one or more program modules 1216 may implement the software architecture of EDA system 100 as described herein in connection with FIG. 1. Program modules 1216, as part of implementing EDA system 100, may include software capable of performing a design flow (e.g., synthesis, placement, and/or routing) on a circuit design or portion thereof so that a circuit design may be physically realized in an IC.

Data processing system 1200 may include one or more Input/Output (I/O) interfaces 1218 communicatively linked to bus 1206. I/O interface(s) 1218 allow data processing system 1200 to communicate with one or more external devices 1220 and/or communicate over one or more networks such as a local area network (LAN), a wide area network (WAN), and/or a public network (e.g., the Internet). Examples of I/O interfaces 1218 may include, but are not limited to, network cards, modems, network adapters, hardware controllers, etc. Examples of external devices also may include devices that allow a user to interact with data processing system 1200 (e.g., a display, a keyboard, and/or a pointing device) and/or other devices such as accelerator card.

Data processing system 1200 is only one example implementation. Data processing system 1200 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 12 is not intended to suggest any limitation as to the scope of use or functionality of example implementations described herein. Data processing system 1200 is an example of computer hardware that is capable of performing the various operations described within this disclosure. In this regard, data processing system 1200 may include fewer components than shown or additional components not illustrated in FIG. 12 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1200 may be operational with numerous other general-purpose or special-purpose computing system environments or configurations. Examples of computing systems, environments, and/or configurations that may be suitable for use with data processing system 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1200 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Program modules 1216 also may include software that is capable of performing an implementation flow on a circuit design or portion thereof. In this regard, data processing system 1200 serves as an example of one or more EDA tools or a system that is capable of processing circuit designs through a design flow.

FIG. 13 is another example method 1300 of synthesizing an application for implementation in a DPE array of an IC. Method 1300 may be performed by EDA system 100 described in connection with FIG. 1 to process application 106. Application 106 instantiates one or more components of a hardware library package 102. In block 1302, the EDA system 100 is capable of detecting a component of a hardware library package instantiated by application 106. Application 106 is specified in source code and is configured to execute on a DPE array such as DPE array 902 or 1000. Application 106 may include source code as illustrated in FIG. 3.

In block 1304, EDA system 100 is capable of extracting an instance of the component from the application. The extracted instance (or component instance as sometimes referred to herein) specifies values of parameters for the instance of the component. An example of an instance extracted from an application is shown in FIG. 6. In block 1306, the EDA system 100 is capable of partitioning the instance of the component by generating source code defining one or more kernels corresponding to the instance of the component. An example of source code generated by the EDA system 100 in block 1306 is shown in FIG. 7. The partitioning performed in block 1306 is based on defined capabilities of the component and a defined design requirement of the application. For example, the design requirement of the application may be a data throughput requirement for the instance of the component. The component, from the hardware library package, may also have a data throughput rating specified as a capability of the component that may be compared with the design requirement. As previously illustrated, the EDA system 100 is capable of increasing the number of kernels used to implement the component instances until the combined capability of the component (e.g., each kernel) provides meets the design requirement.

In block 1308, the EDA system 100 is capable of transforming the application 106 by replacing the instance of the component (e.g., source code of FIG. 3) with the source code generated by the partitioning (e.g., source code of FIG. 8). In doing so, the source code of FIG. 7 is incorporated into application 106. In block 1310, the EDA system 100 is capable of compiling the application, as transformed in block 1308, into program code executable by the DPE array.

The foregoing and other implementations can each optionally include one or more of the following features, alone or in combination. Some example implementations include all the following features in combination.

In one aspect, EDA system 100 is capable of generating an AST from the application. The EDA system 100 is capable of extracting the instance of the component from the AST that is generated.

In another aspect, prior to the compiling, the EDA system 100 is capable of validating the values of the parameters for the instance of the component based on design rules for the component. For example, the validation layer 110 is capable of operating on the instance, as extracted, to evaluate the values of the parameters and compare the values against one or more design rule checks for the component.

In another aspect, the method includes generating an error message in response to determining that the values of the parameters for the instance of the component violate one or more of the design rules for the component.

In another aspect, the source code of the application, which may be specified as HLPL source code, defines a dataflow graph or subgraph that connects an input of the instance of the component to an input of the application and an output of the instance of the component to an output of the application.

In another aspect, the partitioning generates a plurality of kernels implementing the instance of the component.

In another aspect, the compiling maps the plurality of kernels to particular DPEs of the DPE array, maps data structures of the application to particular memories of the DPE array, and generates executable program code for the application according to the mapping.

In another aspect, the EDA system 100 is capable of generating an error during the compiling in response to determining that the application requires more hardware resources than are available in the DPE array. For example, in response to determining that the DPE array does not include sufficient cores and/or memory to map the transformed application thereto, the EDA system 100 is capable of generating an error message.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms “a,” “an,” and “the” are intended to include the plural forms as well, unless the context clearly indicates otherwise.

As defined herein, the term “approximately” means nearly correct or exact, close in value or amount but not precise. For example, the term “approximately” may mean that the recited characteristic, parameter, or value is within a predetermined amount of the exact characteristic, parameter, or value.

As defined herein, the terms “at least one,” “one or more,” and “and/or,” are open-ended expressions that are both conjunctive and disjunctive in operation unless explicitly stated otherwise. For example, each of the expressions “at least one of A, B, and C,” “at least one of A, B, or C,” “one or more of A, B, and C,” “one or more of A, B, or C,” and “A, B, and/or C” means A alone, B alone, C alone, A and B together, A and C together, B and C together, or A, B and C together.

As defined herein, the term “automatically” means without human intervention. As defined herein, the term “user” means a human being. The term “designer” may also refer to a user.

As defined herein, the term “computer readable storage medium” means a storage medium that contains or stores program code for use by or in connection with an instruction execution system, apparatus, or device. As defined herein, a “computer readable storage medium” is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term “if” means “when” or “upon” or “in response to” or “responsive to,” depending upon the context. Thus, the phrase “if it is determined” or “if [a stated condition or event] is detected” may be construed to mean “upon determining” or “in response to determining” or “upon detecting [the stated condition or event]” or “in response to detecting [the stated condition or event]” or “responsive to detecting [the stated condition or event]” depending on the context.

As defined herein, the term “responsive to” and similar language as described above, e.g., “if,” “when,” or “upon,” means responding or reacting readily to an action or event. The response or reaction is performed automatically. Thus, if a second action is performed “responsive to” a first action, there is a causal relationship between an occurrence of the first action and an occurrence of the second action. The term “responsive to” indicates the causal relationship.

As defined herein, the term “substantially” means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term “program code” is used interchangeably with the term “computer readable program instructions.” Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

detecting, using computer hardware, a component of a hardware library package instantiated by an application, wherein the application is specified in source code and is configured to execute on a data processing engine (DPE) array;

extracting, using the computer hardware, an instance of the component from the application, wherein the extracted instance specifies values of parameters for the instance of the component;

partitioning, using the computer hardware, the instance of the component by determining a number of kernels needed to implement the instance of the component based on a defined performance metric of the component and a defined performance requirement of the application and generating program code specifying a plurality of kernels corresponding to the determined number of kernels implementing the instance of the component;

transforming, using the computer hardware, the application by replacing the instance of the component with the program code generated by the partitioning; and compiling the application, as transformed, into program code executable by the DPE array, wherein the compiling maps the plurality of kernels to particular DPEs of the DPE array, maps data structures of the application to particular memories of the DPE array, and generates executable program code for the application according to the mapping.

2. The method of claim 1, comprising:

generating an abstract syntax tree from the application, wherein the instance of the component is extracted from the abstract syntax tree.

3. The method of claim 1, comprising:

prior to the compiling, validating the values of the parameters for the instance of the component based on design rules for the component.

4. The method of claim 3, comprising:

generating an error message in response to determining that the values of the parameters for the instance of the component violate one or more of the design rules for the component.

5. The method of claim 1, wherein the source code defines a dataflow graph that connects an input of the instance of the component to an input of the application and an output of the instance of the component to an output of the application.

6. The method of claim 1, comprising:

generating an error during the compiling in response to determining that the application requires more hardware resources than are available in the DPE array.

7. A system, comprising:

one or more processors configured to initiate operations including:

detecting a component of a hardware library package instantiated by an application, wherein the application is specified in source code and is configured to execute on a data processing engine (DPE) array;

extracting an instance of the component from the application, wherein the extracted instance specifies values of parameters for the instance of the component;

partitioning the instance of the component by determining a number of kernels needed to implement the instance of the component based on a defined performance metric of the component and a defined performance requirement of the application and generating program code defining a plurality of kernels corresponding to the determined number of kernels implementing the instance of the component;

transforming the application by replacing the instance of the component with the program code generated by the partitioning; and compiling the application, as transformed, into program code executable by the DPE array, wherein the compiling maps the plurality of kernels to particular DPEs of the DPE array, maps data structures of the application to particular memories of the DPE array, and generates executable program code for the application according to the mapping.

8. The system of claim 7, wherein the processor is configured to initiate operations comprising:

generating an abstract syntax tree from the application, wherein the instance of the component is extracted from the abstract syntax tree.

9. The system of claim 7, wherein the processor is configured to initiate operations comprising:

prior to the compiling, validating the values of the parameters for the instance of the component based on design rules for the component.

10. The system of claim 9, wherein the processor is configured to initiate operations comprising:

generating an error message in response to determining that the values of the parameters for the instance of the component violate one or more of the design rules for the component.

11. The system of claim 7, wherein the source code defines a dataflow graph that connects an input of the instance of the component to an input of the application and an output of the instance of the component to an output of the application.

12. The system of claim 7, wherein the processor is configured to initiate operations comprising:

generating an error during the compiling in response to determining that the application requires more hardware resources than are available in the DPE array.

13. A method, comprising:

detecting, using computer hardware, a component of a hardware library package instantiated by an application, wherein the application is specified in source code and is configured to execute on a data processing engine (DPE) array;

extracting, using the computer hardware, an instance of the component from the application, wherein the extracted instance specifies values of parameters for the instance of the component;

partitioning, using the computer hardware, the instance of the component by generating program code defining one or more kernels corresponding to the instance of the component, wherein the partitioning is based on a defined performance metric of the component and a defined performance requirement of the application;

wherein the partitioning generates a plurality of kernels implementing the instance of the component;

transforming, using the computer hardware, the application by replacing the instance of the component with the program code generated by the partitioning; and compiling the application, as transformed, into program code executable by the DPE array, wherein the compiling maps the plurality of kernels to particular DPEs of the DPE array, maps data structures of the application to particular memories of the DPE array, and generates executable program code for the application according to the mapping.

14. The method of claim 13, comprising:

generating an abstract syntax tree from the application, wherein the instance of the component is extracted from the abstract syntax tree.

15. The method of claim 13, comprising:

prior to the compiling, validating the values of the parameters for the instance of the component based on design rules for the component.

16. The method of claim 15, comprising:

generating an error message in response to determining that the values of the parameters for the instance of the component violate one or more of the design rules for the component.

17. The method of claim 13, wherein the source code defines a dataflow graph that connects an input of the instance of the component to an input of the application and an output of the instance of the component to an output of the application.

18. The method of claim 13, comprising:

generating an error during the compiling in response to determining that the application requires more hardware resources than are available in the DPE array.

19. A method, comprising:

detecting, using computer hardware, a component of a hardware library package instantiated by an application, wherein the application is specified in source code and is configured to execute on a data processing engine (DPE) array;

extracting, using the computer hardware, an instance of the component from the application, wherein the extracted instance specifies values of parameters for the instance of the component;

partitioning, using the computer hardware, the instance of the component by generating program code defining one or more kernels corresponding to the instance of the component, wherein the partitioning is based on a defined performance metric of the component and a defined performance requirement of the application;

transforming, using the computer hardware, the application by replacing the instance of the component with the program code generated by the partitioning;

compiling the application, as transformed, into program code executable by the DPE array; and generating an error during the compiling in response to determining that the application requires more hardware resources than are available in the DPE array.

* * * * *